(12) United States Patent
Longley et al.

(10) Patent No.: US 12,003,004 B2
(45) Date of Patent: Jun. 4, 2024

(54) THERMAL MANAGING END PLATE FOR FUEL CELL STACK ASSEMBLY

(71) Applicant: Intelligent Energy Limited, Loughborough (GB)

(72) Inventors: Stephen Longley, Loughborough (GB); Jonathan Cole, Loughborough (GB)

(73) Assignee: INTELLIGENT ENERGY LIMITED (GB)

( * ) Notice: Subject to any disclaimer, the term of this patent is extended or adjusted under 35 U.S.C. 154(b) by 66 days.

(21) Appl. No.: 17/695,232

(22) Filed: Mar. 15, 2022

(65) Prior Publication Data
US 2022/0209256 A1 Jun. 30, 2022

Related U.S. Application Data

(63) Continuation of application No. 17/203,601, filed on Mar. 16, 2021, now Pat. No. 11,309,552, which is a (Continued)

(30) Foreign Application Priority Data

Apr. 18, 2018 (GB) ..................................... 1806344

(51) Int. Cl.
*H01M 8/0267* (2016.01)
*H01M 8/0228* (2016.01)
(Continued)

(52) U.S. Cl.
CPC ....... *H01M 8/0267* (2013.01); *H01M 8/0228* (2013.01); *H01M 8/0263* (2013.01);
(Continued)

(58) Field of Classification Search
None
See application file for complete search history.

(56) References Cited

U.S. PATENT DOCUMENTS

| 4,719,157 A | 1/1988 | Tsutsumi et al. |
| 2008/0057372 A1 | 3/2008 | Sommer et al. |

(Continued)

FOREIGN PATENT DOCUMENTS

| CN | 86103794 A | 12/1986 |
| CN | 1996646 A | 7/2007 |

(Continued)

OTHER PUBLICATIONS

KR20170079029A—machine translation (Year: 2017).
(Continued)

*Primary Examiner* — Haroon S. Sheikh
(74) *Attorney, Agent, or Firm* — BAKERHOSTETLER LLP

(57) ABSTRACT

Fuel cell stack assemblies having a positive end plate and a negative end plate. The end plates can be formed from a central structural element with an insulating end plate cover and an insulating end plate manifold. A plurality of cathode plates and a plurality of fuel cell assemblies can be arranged in a stack having an alternating pattern of cathode plates and fuel cell assemblies, with the positive end plate and the negative end plate provided on either end of the stack of cathode plates and fuel cell assemblies.

7 Claims, 2 Drawing Sheets

Related U.S. Application Data continuation of application No. 17/048,469, filed as application No. PCT/GB2019/051073 on Apr. 16, 2019, now Pat. No. 10,998,558.

(51) Int. Cl.
  *H01M 8/0263* (2016.01)
  *H01M 8/04007* (2016.01)
  *H01M 8/04014* (2016.01)
  *H01M 8/04701* (2016.01)
  *H01M 8/2483* (2016.01)

(52) U.S. Cl.
  CPC ... *H01M 8/04014* (2013.01); *H01M 8/04074* (2013.01); *H01M 8/04701* (2013.01); *H01M 8/2483* (2016.02)

(56) References Cited

U.S. PATENT DOCUMENTS

| | | | |
|---|---|---|---|
| 2010/0143765 | A1 | 6/2010 | Chen et al. |
| 2011/0294030 | A1 | 12/2011 | Yamamoto |
| 2014/0038029 | A1 | 2/2014 | Thurmeier et al. |
| 2015/0093670 | A1* | 4/2015 | Kobayashi ............ H01M 8/241 429/434 |
| 2016/0233530 | A1 | 8/2016 | Mathie et al. |
| 2017/0110755 | A1 | 4/2017 | Ikeda et al. |

FOREIGN PATENT DOCUMENTS

| | | |
|---|---|---|
| CN | 201528012 U | 7/2010 |
| CN | 101803084 A | 8/2010 |
| CN | 102447120 A | 5/2012 |
| CN | 106558710 A | 4/2017 |
| EP | 2860807 A1 | 4/2015 |
| JP | 2001-236982 A | 8/2001 |
| JP | 2009-224195 A | 10/2009 |
| JP | 2010-262908 A | 11/2010 |
| JP | 2011-198538 A | 10/2011 |
| JP | 2012-038482 A | 2/2012 |
| JP | 2013-182818 A | 9/2013 |
| JP | 2017-162673 A | 9/2017 |
| KR | 2009-0028941 A | 3/2009 |
| KR | 10-1379323 | 3/2014 |
| KR | 2017-0079029 A | 7/2017 |
| TW | 201023424 A | 6/2010 |

OTHER PUBLICATIONS

International Search Report dated Jul. 26, 2019 in related International Patent Application No. PCT/GB2019/051073 filed Apr. 16, 2019.
Written Opinion dated Jul. 26, 2019 in related International Patent Application No. PCT/GB2019/051073 filed Apr. 16, 2019.
International Patent Application No. PCT/GB2019/051073; Int'l Preliminary Report on Patentability; dated Oct. 29, 2020; 8 pages.
Great Britain Patent Application No. 2013761.8; Combined Search and Examination Report; dated Oct. 15, 2020; 5 pages.

* cited by examiner

THERMAL MANAGING END PLATE FOR FUEL CELL STACK ASSEMBLY

CROSS-REFERENCE TO RELATED APPLICATIONS

The present application is a Continuation of U.S. patent application Ser. No. 17/203,601 filed Mar. 16, 2021, which is a Continuation of U.S. patent application Ser. No. 17/048,469 filed Oct. 16, 2020, which is a 371 National Stage of International Patent Application No. PCT/GB2019/051073 filed Apr. 16, 2019, which claims priority to Great Britain patent application no. 1806344.6 filed Apr. 18, 2018, the disclosures of all of which are incorporate by reference herein in their entirety.

FIELD OF THE DISCLOSURE

This disclosure is in the field of endplates for fuel cell stack assemblies. In particular, the disclosure relates to devices and methods for use in providing thermal insulation to fuel cell stack assemblies.

BACKGROUND

Conventional electrochemical fuel cells convert fuel and oxidant into electrical energy and a reaction product. A typical fuel cell comprises a plurality of layers, including an ion transfer membrane sandwiched between an anode and a cathode to form a membrane-electrode assembly, or MEA.

Sandwiching the membrane and electrode layers is an anode fluid flow field plate for conveying fluid fuel to the anode, and a cathode fluid flow field plate for conveying oxidant to the cathode and for removing reaction by-products. Fluid flow field plates are conventionally fabricated with fluid flow passages formed in a surface of the plate, such as grooves or channels in the surface presented to the porous electrodes.

A typical single cell of a proton exchange membrane fuel cell will, under normal operating conditions, provide an output voltage between 0.5 and 1.0 Volt. Many applications and electrical devices require high voltages for efficient operation. These elevated voltages are conventionally obtained by connecting a plurality of individual cells in series to form a fuel cell stack. To decrease the overall volume and weight of the stack, a bipolar plate arrangement is utilised to provide the anode fluid flow field plate for one cell, and the cathode fluid flow field plate for the adjacent cell. Suitable flow fields are provided on each side of the plate, carrying fuel (eg. hydrogen, or a hydrogen rich gas) on one side and oxidant (eg. air) on the other side. Bipolar plates are both gas impermeable and electrically conductive and thereby ensure efficient separation of reactant gases whilst providing an electrically conducting interconnect between cells. Fluids are conventionally delivered to each fluid flow field plate by way of common manifolds that run down the height of the stack, formed from aligned apertures in each successive plate. The area of a single fuel cell can vary from a few square centimetres to hundreds of square centimetres. A stack can consist of a few cells to hundreds of cells connected in series using bipolar plates. Two current collector plates, one at each end of the complete stack of fuel cells, are used to provide connection to the external circuit.

There are a number of important considerations in assembling the fuel cell stack. Firstly, the individual layers or plates must be positioned correctly to ensure that gas flow channels and manifolds are in correct alignment. Secondly, the contact pressure between adjacent plates is used to form gas tight seals between the various elements in the manifolds and gas flow channels. Conventionally, the gas tight seals include compressible gaskets that are situated on the surfaces of predetermined faces of the plates. Therefore, in order to ensure proper gas tight sealing, an appropriate compression force must be applied to all of the plates in the stack, orthogonal to the surface planes of the plates in the stack, to ensure that all gaskets and sealing surfaces are properly compressed. Thirdly, a compressive force is essential to ensure good electrical connectivity between adjacent layers. At the outer ends of the stack, substantially rigid end plates are usually deployed for the application of suitable compression forces to retain the stack in its assembled state.

For optimum performance of a fuel cell stack, compression of the MEA across each fuel cell must be sufficiently high to avoid higher contact resistance and lower efficiency due to ohmic losses. It is also desirable to provide even compression of each MEA across the surface of each fuel cell in order to avoid the formation of shear stress exerted on the MEA, which can lead to cell failure due to pin-holing of the MEA. Uniformity of compression throughout a fuel cell stack is important to stack electrical performance, which is limited by electrical variations throughout the stack, which can have tens or hundreds of fuel cells contained in a stack under several tons of compressive force between a pair of end plates. It is important to avoid any variations from being introduced during the manufacturing and assembly processes or from uneven component thicknesses, either laterally across the width of each plate or longitudinally along the length of each flow channel of each plate, as these variations can lead to problems with uniformity throughout a fuel cell stack having tens or hundreds of repeated component layers.

Further, for optimum performance of a fuel cell stack, temperature variations between the fuel cells within the stack must be minimized, and compatibility with a wide range of temperatures for operational environments and climates are necessary for commercial applications Thus, there is a need for improved end plates for fuel cell stacks that can provide the necessary functionalities for commercial applications. The disclosure is directed to these and other important needs.

DISCLOSURE

The present disclosure provides aspects of end plates for fuel cell stack assemblies, the end plates comprising a central structural element having a top face and a bottom face, an end plate cover covering the top face, and an end plate manifold covering the bottom face. The end plates can have a central structural element formed from aluminum. The end plates can have a central structural element formed from a para-aramid synthetic fiber or a carbon fiber composite. The end plates can have a end plate cover, end plate manifold, or both formed from an electrically insulating material. The electrically insulating material is PC-ABS blends, PET, glass-filled PET, PA6, glass-filled PA6, PBT, PEI, or mixtures thereof. The end plate cover and end plate manifold can be releasably engageable to each other through a portion of the central structural element via a plurality of snap clips. The central structural element can be formed with a rib-and-core or honeycombed structure with voids formed extending from the top face to the bottom face. The end plate manifold can be provided with a ribbed structure to provide for air flow channels from a first side edge to an opposing side edge. In some implementations, the end plates can be positive end plates having positive end plate manifolds having air flow channels formed as straight airflow channels. In other implementations, the end plates can be negative end plates having negative end plate manifolds having air flow channels formed as sinusoidal-wave-shaped airflow channels.

The present disclosure provides aspects of fuel cell stack assemblies comprising a positive end plate as described herein, a negative end plate as described herein, a plurality of cathode plates and a plurality of fuel cell assemblies, arranged in a stack having an alternating pattern of cathode plates and fuel cell assemblies. The positive end plate and the negative end plate can be provided on either end of the stack of cathode plates and fuel cell assemblies. The final cathode plate in the stack can be adjacent to the positive end plate. The negative end plate can be adjacent to the first fuel cell assembly. The fuel cell stack assembly can be under compressive force between the positive end plate and the negative plate. The fuel cell stack assembly can have a positive end plate and a negative end plate provided with airflow channels. The airflow channels of the positive end plate can be formed as airflow channels having straight-walls from the first side edge to the opposing side edge, and the airflow channels of the negative end plate can be formed as sinusoidal-wave-shaped airflow channels from the first side edge to the opposing side edge. Current collection can be achieved directly from each end cell or via a current collector plate that is disposed between each end cells and adjacent end plate.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In the figures, like reference numerals designate corresponding parts throughout the different views. All callouts and annotations are hereby incorporated by this reference as if fully set forth herein. In addition, the drawings are not necessarily drawn to scale. In the drawings:

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about," it will be understood that the particular value forms another exemplar. All ranges are inclusive and combinable.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any subcombination. Further, reference to values stated in ranges include each and every value within that range.

Figure 1:
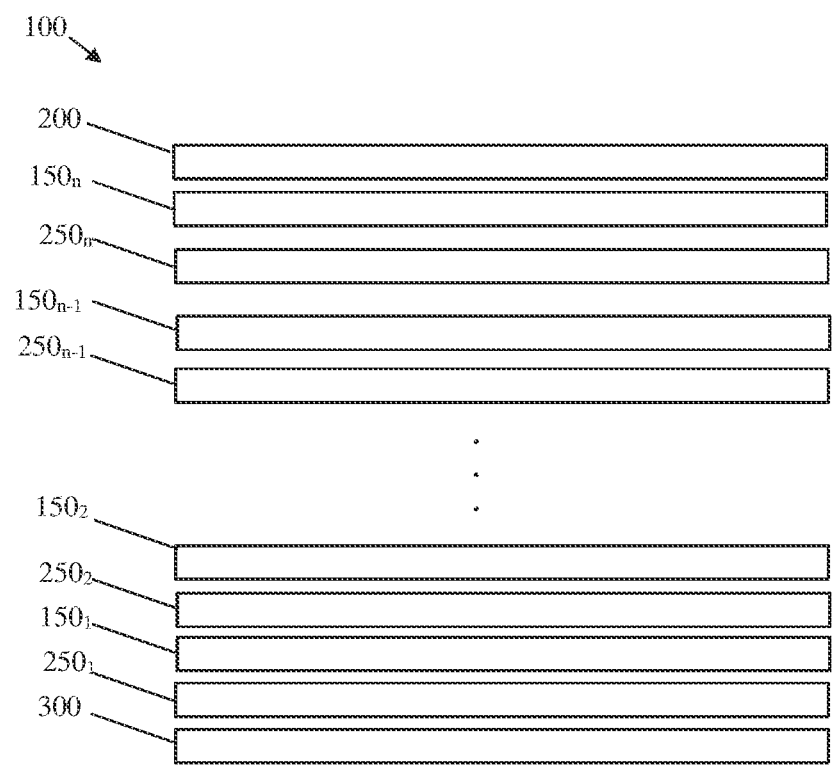
FIG. 1 illustrates aspects of an exploded side view of components of a fuel cell stack assembly of the present disclosure.

FIG. 1 shows a schematic side view of an exploded assembly of a fuel cell stack assembly of the present disclosure. A positive end plate 200 and a negative end plate 300 are provided on either end of the fuel cell stack assembly 100. When assembled, compressive force is applied between the positive end plate 200 and negative end plate 300 to compress the internal layers together with sufficient force for optimal electrical performance. The internal layers include a plurality of cathode plates $150_1$ to $150_n$ and fuel cell assemblies $250_1$ to $250_n$, provided in alternating layers of cathode plates and fuel cell assemblies. Cathode plate $150_n$ is adjacent to the positive end plate 200, while the negative end plate 300 is adjacent to the first fuel cell assembly $250_1$. Current collection can be achieved directly from the end cells, $250_1$ and $250_n$, or via current collector plates (not shown) that are disposed between each of the end cells and adjacent end plates 200, 300. The use of current collector plates can avoid ohmic losses and improve performance.

It has been observed that with conventional end plates, a fuel cell stack assembly cannot be operated in low environmental temperatures without cathode air recirculation to maintain an adequate temperature on the top and bottom fuel cells (the fuel cells within the first and n-th fuel cell assemblies $250_1$ and $250_n$). The temperature problems with the top and bottom fuel cells were determined to result from overcooling or overheating due to a lack of thermal insulation provided by the end plates from the surrounding environmental temperatures. Conventional end plates are formed from cast or machined metallic materials which are over-moulded with suitable polymeric compounds to provide suitable electrical isolation. Alternatively, conventional end plates can be formed as molded polymeric reinforced laminates. Such known endplates can provide an excess of thermal flux outward from the adjacent fuel cells. In particular, the top fuel cell can experience overcooling, due to being surrounded on both sides with cathode plates $150_n$ and $150_{n-1}$, with only cathode plate $150_{n-1}$ experiencing heating from another adjacent fuel cell assembly $250_{n-1}$. Cathode plate $150_n$ can provide overcooling as it is not heated by another adjacent fuel cell and is instead thermally contacting the positive end plate 200. Accordingly, the top fuel cell can be overcooled when a conventional positive end plate is utilized in a fuel cell stack. Conversely, the bottom fuel cell $250_1$ can be overheated in certain operational environments as it is only adjacent to one cathode plate and receives some limited cooling effects from the negative end plate 300.

In one aspect, the present disclosure provides improved designs for the positive end plates 200 and negative end plates 300 for use in the fuel cell stack assemblies as shown in FIG. 1. It has been discovered through experimentation that a more even temperature profile across the fuel cell assemblies $250_1$ and $250_n$ can be achieved by utilizing end plates formed from a plurality of components, rather than an overmolded metallic piece.

Figure 2:
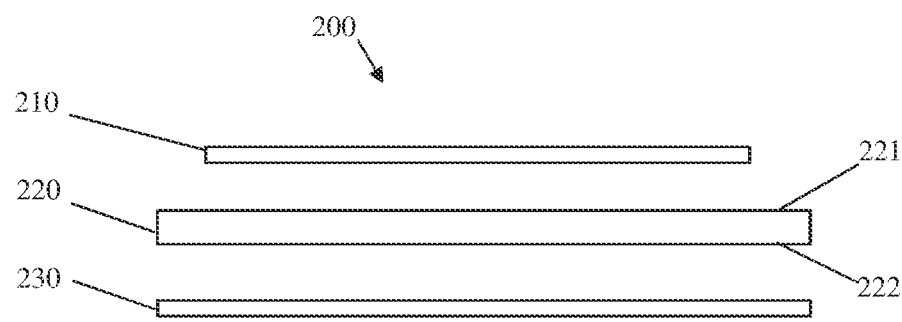
FIG. 2 illustrates aspects of an exploded side view of components of a positive end plate of the present disclosure.

FIG. 2 shows aspects of a schematic of an exploded side view of a positive end plate 200 of the present disclosure. A positive end plate 200 can be formed from a central structural element 220, which is covered on a top face 221 by a positive end plate cover 210, and covered on a bottom face 222 by a positive end plate manifold 230. Positive end plate manifold 230 is adjacent to the n-th cathode plate $150_n$ in the assembled fuel cell stack assembly. Central structural element 220 is formed from a sufficiently rigid material in order to provide structural strength to withstand the overall compression forces on the assembled fuel cell stack. In certain implementations, the structural element 220 can be formed from a lightweight metal such as aluminum. In other implementations, rigid materials such as a para-aramid synthetic fiber or carbon fiber composites can be used, provided that strength/weight performance is adequate to provide desired power/mass density for the overall fuel cell stack assembly. The positive end plate cover 210 and positive end plate manifold 230 are formed from electrically insulating materials, such as plastic. In certain implementations, the positive end plate cover 210 and positive end plate manifold 230 are releasably engageable to each other through a portion of the central structural element 220 via a plurality of snap clips. This engagement can aid in the assembly process, such that the positive end plate 200 can hold itself together while the fuel cell stack assembly components are layered together prior to application of the desired compression force.

In some implementations, positive end plate cover 210 and positive end plate manifold 230 are formed from plastic or polymeric resin materials. Suitable materials can withstand operational temperatures within the fuel cell stack assembly, are compatible with hydrogen gas, and can be PC-ABS blends, PET, glass-filled PET, PA6, glass-filled PA6, PBT, PEI, or mixtures thereof. In certain implementations, one or both of the positive end plate cover 210 and positive end plate manifold 230 can be formed from glass-filled PET, including RYNITE® sold by DuPont USA Performance Polymers.

In certain implementations, the thermal insulation is increased by reducing the contact area between the structural element 220 and the positive end plate cover 210, and reducing the contact area between the structural element 220 and positive end plate manifold 230. The contact areas can be reduced by removing as much of the hulk material within the structural element 220 by creating a rib-and-core or honeycombed structure in the structural element 220, with voids formed extending from the top face 221 to the bottom face 222. The inclusion of voids in the structural element 220 reduces the thermal flux transfer pathways from the outside environment of the fuel cell stack assembly and the top-most fuel cell assembly $250_n$.

The positive end plate manifold 230 can be provided with a ribbed structure to provide for fluid flow channels as well as a reduced contact area between the positive end plate manifold 230 and the structural element 220. Air flow is provided from one side edge 231 to an opposing side edge 232 of the positive end plate manifold 230. In some implementations, in order to reduce heat removal and avoid overcooling of the top-most fuel cell assembly $250_n$, straight-walled airflow channels can be provided to allow for the fastest airflow through past the positive end plate manifold 230 and adjacent cathode plate $150_n$ and avoid excessive heat removal.

Figure 3:
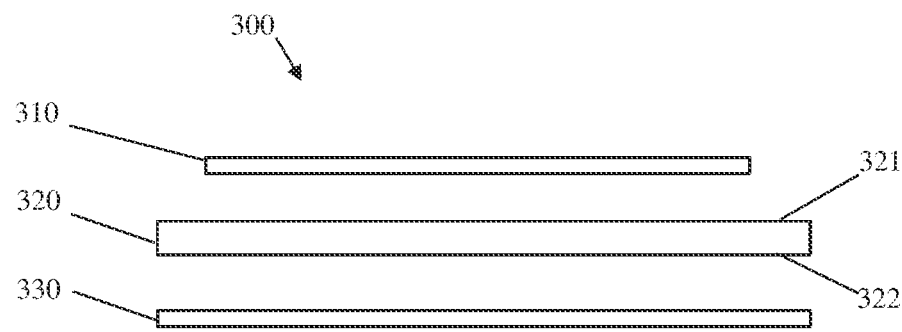
FIG. 3 illustrates aspects of an exploded side view of components of a negative end plate of the present disclosure.

FIG. 3 shows aspects of a schematic of an exploded side view of a negative end plate 300 of the present disclosure. A negative end plate 300 can be formed from a central structural element 320, which is covered on a top face 322 by a negative end plate cover 310, and covered on a bottom face 321 by a negative end plate manifold 330. Negative end plate manifold 330 is adjacent to the first fuel cell assembly $250_1$ in the assembled fuel cell stack assembly. Central structural element 320 is formed from a sufficiently rigid material in order to provide structural strength to withstand the overall compression forces on the assembled fuel cell stack. In certain implementations, the structural element 320 can be formed from a lightweight metal such as aluminum. In other implementations, rigid materials such as a para-aramid synthetic fiber or carbon fiber composites can be used, provided that strength/weight performance is adequate to provide desired power/mass density for the overall fuel cell stack assembly. The negative end plate cover 310 and negative end plate manifold 330 are formed from electrically insulating materials, such as plastic. In certain implementations, the negative end plate cover 310 and negative end plate manifold 330 are releasably engageable to each other through a portion of the central structural element 320 via a plurality of snap clips. This engagement can aid in the assembly process, such that the negative end plate 300 can hold itself together while the fuel cell stack assembly components are layered together prior to application of the desired compression force.

In some implementations, negative end plate cover 310 and negative end plate manifold 330 are formed from plastic or polymeric resin materials. Suitable materials can withstand operational temperatures within the fuel cell stack assembly, are compatible with hydrogen gas, and can be PC-ABS blends, PET, glass-filled PET, PA6, glass-filled PA6, PBT, PET, or mixtures thereof. In certain implementations, one or both of the negative end plate cover 310 and negative end plate manifold 330 can be formed from glass-filled PET, including RYNITE® sold by DuPont USA Performance Polymers.

In certain implementations, the thermal insulation is increased by reducing the contact area between the structural element 320 and the negative end plate cover 310, and reducing the contact area between the structural element 320 and negative end plate manifold 330. The contact areas can be reduced by removing as much of the bulk material within the structural element 320 by creating a rib-and-core or honeycombed structure in the structural element 320, with voids formed extending from the top face 322 to the bottom face 321. The inclusion of voids in the structural element 320 reduces the thermal flux transfer pathways from the outside environment of the fuel cell stack assembly and the first fuel cell assembly $250_1$.

The negative end plate manifold 330 can be provided with a ribbed structure to provide for fluid flow channels as well as a reduced contact area between the negative end plate manifold 330 and the structural element 320. Air flow is provided from one side edge 331 to an opposing side edge 332 of the negative end plate manifold 330. In some implementations, in order to increase heat removal and avoid overheating of the first fuel cell assembly $250_1$, sinusoidal-wave-shaped airflow channels can be provided to slow the airflow through past the negative end plate manifold 330 and adjacent fuel cell assembly 250₁ and avoid excessive heat buildup. Further description of suitable sinusoidal wave-shaped airflow channels is provided in co-pending UK patent application entitled "COOLING PLATES FOR FUEL CELLS" filed on the same day as this application, the contents of which are hereby incorporated by reference in their entirety.

In some aspects, the present disclosure provides for an asymmetrical fuel cell stack assembly having a positive end plate and a negative end plate which have different structural features in order to have different thermal transfer properties. As described above, the negative end plate can utilize a negative end plate manifold having air flow channels designed for greater heat removal from an adjacent component as compared to the positive end plate manifold, which has air flow channels designed for less heat removal from an adjacent component. Such an implementation was found to provide the optimal balance of heat removal from an operational fuel cell stack assembly and thermal insulation from a surrounding environmental condition. Accordingly, the potential operating temperature window can be increased.

Example 1

A negative end plate 300 of the present disclosure as depicted in FIG. 3 was modeled for 3D FEA thermal analysis. The negative end plate 300, was modeled from an aluminum central structural element 320, which is covered on a top face 322 by a negative end plate cover 310, and covered on a bottom face 321 by a negative end plate manifold 230. The negative end plate cover 310 and the negative end plate manifold 230 were modeled as glass-filled PA6 nylon. A conventional end plate, formed from cast, then machined, aluminum overmolded with glass-filled PA6 nylon was modeled for 3D FEA thermal analysis for comparison. Heat loss was reduced from 25.27 W to 17.6 W.

Example 2

A positive end plate 200 of the present disclosure as depicted in FIG. 3 was modeled for 3D FEA thermal analysis. The positive end plate 200, was modeled from an aluminum central structural element 220, which is covered on a top face 221 by a positive end plate cover 210, and covered on a bottom face 222 by a positive end plate manifold 230. The positive end plate cover 210 and the positive end plate manifold 230 were modeled as glass-filled PA6 nylon. A conventional end plate, formed from cast, then machined, aluminum overmolded with glass-filled PA6 nylon was modeled for 3D FEA thermal analysis for comparison. Heat loss was reduced from 28.78 W to 20.85 W.

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and subcombinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true scope of the disclosure as defined in the appended claims.

The invention claimed is:

1. A method of balancing heat removal from an operational fuel cell stack to increase the operating temperature window, the method comprising:
   forming an asymmetrical fuel cell stack assembly having a positive end plate and a negative end plate which have different structural features;
   wherein the negative end plate manifold (330) has sinusoidal-wave-shaped air flow channels from a first side edge (331) to an opposing side edge (332);
   wherein the positive end plate manifold has airflow formed as straight walls from the first side edge (231) to the opposing side edge (232); and
   wherein heat loss from at least one end plate manifold is reduced.

2. The method of balancing heat removal from an operational fuel cell stack of claim 1, wherein in the heat loss at the negative end plate manifold is reduce at least 20%.

3. The method of balancing heat removal from an operational fuel cell stack of claim 1, wherein in the heat loss at the negative end plate manifold is reduce at least 25%.

4. The method of balancing heat removal from an operational fuel cell stack of claim 1, wherein in the heat loss at the negative end plate manifold is reduce about 30%.

5. The method of balancing heat removal from an operational fuel cell stack of claim 1, wherein in the heat loss at the positive end plate manifold is reduce at least 20%.

6. The method of balancing heat removal from an operational fuel cell stack of claim 1, wherein in the heat loss at the positive end plate manifold is reduce at least 25%.

7. The method of balancing heat removal from an operational fuel cell stack of claim 1, wherein in the heat loss at the positive end plate manifold is reduce about 28%.

* * * * *